US006512034B1

(12) United States Patent
Hamada et al.

(10) Patent No.: US 6,512,034 B1
(45) Date of Patent: Jan. 28, 2003

(54) CATIONIC GRAFT-MODIFIED NATURAL RUBBER LATEX

(75) Inventors: Akihiko Hamada, Kakogawa (JP); Naoya Ichikawa, Himeji (JP)

(73) Assignee: Sumitomo Rubber Industries, Ltd, Kobe (JP)

( * ) Notice: Subject to any disclaimer, the term of this patent is extended or adjusted under 35 U.S.C. 154(b) by 0 days.

(21) Appl. No.: 09/657,508

(22) Filed: Sep. 8, 2000

(30) Foreign Application Priority Data

Sep. 10, 1999 (JP) ............................. 11-257563

(51) Int. Cl.$^7$ .............. C08K 5/19; C08K 5/08; C08L 7/02; C08L 51/04
(52) U.S. Cl. ............. 524/236; 524/375; 524/504; 524/925; 524/926; 524/575.5
(58) Field of Search ............... 524/929, 925, 524/926, 375, 236, 927, 755, 504, 575.5; 525/335.1; 526/238.3; 156/338; 442/149, 280

(56) References Cited

U.S. PATENT DOCUMENTS 3,607,359 A * 9/1971 Bischoff et al. ............ 442/149
3,661,674 A * 5/1972 Higgs et al.
4,632,847 A * 12/1986 Lomasney et al.
5,190,818 A * 3/1993 Sakai
5,908,893 A * 6/1999 Kawasaki et al.
5,962,147 A * 10/1999 Shalub et al.

FOREIGN PATENT DOCUMENTS

| JP | 925468 | 1/1997 |
| JP | A10259360 | 9/1998 |

OTHER PUBLICATIONS

A.D. Roberts; Natural Rubber Science and Technology; pp. 94 & 95 (1988).

* cited by examiner

Primary Examiner—Peter Szekely
(74) Attorney, Agent, or Firm—Birch, Stewart, Kolasch & Birch, LLP

(57) ABSTRACT

Disclosed is a cationic graft-modified natural rubber latex, which is obtained by cationically modifying the graft-natural natural rubber latex with a cationic surfactant in the presence of a nonionic surfactant such as polyoxyalkylene alkyl phenyl ether, polyoxyalkylene monostyryl phenyl ether, polyoxyalkylene distyryl phenyl ether or polyoxyalkylene tristyryl phenyl ether, the obtained rubber latex being useful as an adhesive for fibers and papers.

6 Claims, No Drawings

CATIONIC GRAFT-MODIFIED NATURAL RUBBER LATEX

BACKGROUND OF THE INVENTION

The present invention relates to a cationic graft-modified natural rubber latex. More particularly, it relates to a cationic graft-modified natural rubber latex which contains a cationic surfactant and a specific nonionic surfactant and is also superior in adhesion to papers and fibers.

Heretofore, a natural rubber latex whose cohesive force is enhanced by modifying a graft has been used in applications such as adhesive. For example, Japanese Published Unexamined Patent (Kokai Tokkyo Koho Hei) No. 10-259360 discloses a primer composition comprising a methyl methacrylate graft copolymer containing a natural rubber as a main polymer, an ultraviolet absorber and an antioxidant, and describes that the primer composition itself is used for forming a primer layer of an applying structure made of polyvinyl chloride. This prior art aims at preventing an adhesive force from lowering by forming a primer layer thereby to prevent ultraviolet light, which has passed through a base material, from reaching an adhesive layer and suppressing oxidative deterioration of these layers.

With regard to a cationic latex, in page 94 of "Natural Rubber Science and Technology" (edited by A. D. Roberts, published by Oxford University Publication, 1988), it is described that a cationic natural rubber latex obtained by adding a cationic surfactant to a natural rubber latex is superior in adhesion to fibers. That is, a latex comprising positively charged particles is obtained by adding a sufficient amount of a cationic surfactant to a natural rubber latex diluted to about 30%. The cationic latex has such a feature that the adhesion to fibers is improved because the fibers are negatively charged when treated in water.

A conventional cationic rubber latex has the features described above, but has various problems in view of practicality. For example, the cationic latex described above has limited applications because of low concentration of the rubber, and its applicability to printing is not sufficient. Furthermore, a conventional cationic graft-modified natural rubber latex is inferior in workability on coating papers or fibers because of high increase in viscosity with a lapse of time and large thixotropy.

SUMMARY OF THE INVENTION

Under these circumstances, the present inventors have intensively studied about cationic modification of a graft-modified natural rubber latex and found that the viscosity of the latex is lowered by cationically modifying a graft-modified natural rubber latex in the presence of a nonionic surfactant (non-ionic surfactant) and also the resulting cationic graft-modified natural rubber latex is stable with a lapse of time. The present inventors have further studied based on this knowledge, thus completing the present invention.

The present invention provides:

1) A cationic graft-modified natural rubber latex comprising a graft-modified natural rubber latex, a cationic surfactant, and one or more nonionic surfactants selected from the group consisting of polyoxyalkylene alkyl phenyl ether, polyoxyalkylene monostyryl phenyl ether, polyoxyalkylene distyryl phenyl ether and polyoxyalkylene tristyryl phenyl ether;
2) The cationic graft-modified natural rubber latex according to the term 1), wherein the cationic surfactant is a quaternary ammonium salt;
3) The cationic graft-modified natural rubber latex according to the term 1), wherein HLB of the nonionic surfactant is within a range from 14 to 19;
4) The cationic graft-modified natural rubber latex according to the term 1), which contains 0.5 to 20% by weight of the cationic surfactant and 0.2 to 5.0% by weight of the nonionic surfactant based on the graft-modified natural rubber component; and
5) The cationic graft-modified natural rubber latex according to the term 1), wherein a protein in the natural rubber latex is subjected to a decomposition treatment.

The cationic graft-modified natural rubber latex of the present invention can be employed as an adhesive in various applications because of low density and stability. The cationic deproteinized natural rubber latex is particularly superior in adhesion to fibers and papers and therefore suited for use as an adhesive for them.

MODE FOR CARRYING OUT THE INVENTION

The cationic graft-modified natural rubber latex of the present invention is obtained by cationically modifying the graft-modified natural rubber latex using the cationic surfactant in the presence of the specific nonionic surfactant described above.

As the graft-modified natural rubber latex as the raw material, for example, those prepared by a conventional method can be used. That is, a radical polymerizable monomer is added to the natural rubber latex, and then the rubber is graft-polymerized in the latex by adding a radical initiator or irradiating with light such as ultraviolet light or radiation such as γ-ray.

The radical polymerizable monomer includes, but is not limited to, acrylic monomer such as methyl methacrylate, methyl acrylate, butyl methacrylate, butyl acrylate, or 2-ethylhexyl acrulate; or styrene monomer. For applications such as adhesive, methyl methacrylate, methyl acrylate or styrene monomer which has a high effect of enhancing a cohesive force is preferable.

The radical initiator includes, for example, redox initiator of hydroperoxide and polyamine, or persulfate. Among these radical initiators, the redox initiator of hydroperoxide and polyamine is preferable because it has a high graft efficiency and is not influenced by ammonia. The radical polymerizable monomer to be grafted is added in the amount within a range from about 10 to 50% by weight based on the rubber component.

The cationic graft-modified natural rubber latex can be obtained by adding the cationic surfactant to the graft-modified natural rubber latex thereby to cationically charge rubber particles. In the present invention, the total solid content in the graft-modified natural rubber latex is preferably within a range from 35 to 60% by weight.

The cationic surfactant is derived from a higher amine, but a quaternary ammonium salt or an alkylamine salt is preferably used in the present invention. The quaternary ammonium salt includes, for example, chlorides such as lauryltrimethylammonium chloride, cetyltrimethylammonium chloride, stearyltrimethylammonium chloride, distearyltrimethylammonium chloride and alkylbenzyldimethylammonium chloride; and bromides corresponding to them. The alkylamine salt includes, for example, coconutamine acetate or stearylamine acetate. Among these, a quaternary ammonium salt is preferable in view of the effect of stabilizing the latex, and cetyltrimethylammonium chloride or its corresponding bromide and stearyltrimethylammonium chloride or its corresponding bromide are particularly preferable.

The amount of the cationic surfactant is appropriately selected and preferably within a range from about 0.5 to 20% by weight, and more preferably from 1 to 10% by weight, based on the graft-modified rubber component of the latex. When the amount of the cationic surfactant is less than 0.5% by weight, the cationic surfactant is not sufficiently adsorbed in the rubber particles of the latex. On the other hand, when the amount exceeds 20% by weight, the moisture-absorption properties of the solid rubber obtained by drying the latex are enhanced and the cost increases, which is not preferable.

The method of adding the cationic surfactant is not specifically limited, but a predetermined amount of an aqueous 10–20 wt % solution of the cationic surfactant is preferably added to the graft-modified natural rubber latex.

The cationic graft-modified natural rubber latex of the present invention is characterized by enabling a specific nonionic surfactant to coexist. As described above, an object of cationically modifying the latex can be attained by adding the cationic surfactant to the graft-modified natural rubber latex. However, the viscosity of the latex is drastically increased by only adding the cationic surfactant to cause gelation sometimes, thereby making it impossible to obtain a latex of practical use. By using the cationic surfactant in combination with the nonionic surfactant, stabilization of the viscosity of the latex is attained, thus obtaining a latex of good practical use. The nonionic surfactant may be added to the graft-modified natural rubber latex, together with the cationic surfactant, and may also be added to the graft-modified natural rubber latex which has once modified cationically. The former addition method is advantageous in view of both the effect and workability.

As the nonionic surfactant, polyoxyalkylene ether surfactants can be used. Among these surfactants, polyoxyalkylene ether surfactant, those belonging to polyoxyalkylene alkyl ether, polyoxyalkylene alkyl phenyl ether, polyoxyalkylene monoostyryl phenyl ether, polyoxyalkylene distyryl phenyl ether and polyoxyalkylene tristyryl phenyl ether are preferable.

The alkyl group in the nonionic surfactant includes alkyl groups having 4 to 30 carbon atoms. The polyoxyalkylene group includes those having a $C_{2-4}$ alkylene group and those wherein the number of ethylene oxide is within a range from about 1 to 50 moles are preferable.

Among the nonionic surfactants described above, those having HLB within a range from 14 to 19 are more preferable because of a large effect of enhancing the storage stability of the latex. As used herein, the term "HLB (Hydrophile-Lipophile-Balance)" means an index which represents a balance between a hydrophilic group and a lipophilic group of the surfactant. In case the hydrophilic group is composed of a polyoxyethylene chain and a polyhydric alcohol (e.g. glycol, glycerin, sorbitan, mannitol, etc.) in the nonionic surfactant, HLB is represented by the following equation.

$$HLB=(E+P)/5$$

where E represents % by weight of an oxyethylene group and P represents % by weight of a polyhydric alcohol, respectively.

The amount of the nonionic surfactant is appropriately selected, but is preferably within a range from 0.2 to 5.0% by weight based on the rubber component of the latex. When the amount of the nonionic surfactant is less than 0.2% by weight, the storage stabilizing effect is poor. On the other hand, the amount exceeds 5.0% by weight, the effect of the cationic surfactant adsorbed in the rubber particles of the latex is lowered.

In the present invention, use of other surfactants such as anionic and amphoteric surfactants in combination is preferably avoided because it eliminates the cationic properties.

The cationic graft-modified natural rubber latex of the present invention can also decompose a protein contained in the latex and the decomposition can be carried out by adding a proteolytic enzyme by a conventional method. The protein has properties of an amphoteric surfactant and adsorption of the cationic surfactant to the rubber particles can be facilitated by decomposing the protein adsorbed or bonded to the rubber particles.

The cationic graft-modified natural rubber latex of the present invention are suited for use as an adhesive, and is particularly suited for use as an adhesive to fibers or papers because of small change in viscosity with a lapse of time and thixotropy.

EXAMPLES

The following Examples and Comparative Examples further illustrate the present invention, but the present invention is not limited to the Examples and Comparative Examples.
[Components to be Incorporated]

In the Examples and Comparative Examples, the following graft-modified natural rubber latex, cationic surfactant and nonionic surfactants were appropriately used.

1) Graft-modified Natural Rubber Latex

A methyl acrylate graft natural rubber latex (manufactured by REGITEX CO., LTD.) was used. This product has the following properties.

Content of methylmethacrylate: about 25% by weight based on the rubber component pH: 10.5

Viscosity: 25 mPs

Total solid content: 52% by weight

2) Cationic Surfactant

Strearyltrimethylammonium chloride (manufactured by Kao Corp. under the trade name of Quartamin 86W) was used.

3) Nonionic Surfactant

In the following Examples 1 to 8, the following nonionic surfactants (any of which are manufactured by Kao Corp.) were appropriately used.

Emulgen 920 (trade name); polyoxyethylene nonyl phenyl ether, HLB: 15.5

Emulgen 930 (trade name); polyoxyethylene nonyl phenyl ether, HLB: 15.1

Emulgen 840S (trade name); polyoxyethylene octyl phenyl ether, HLB: 17.9

Emulgen 913 (trade name); polyoxyethylene nonyl phenyl ether, HLB: 14.5

Emulgen 911 (trade name); polyoxyethylene nonyl phenyl ether, HLB: 13.7

In the following Comparative Examples 1 to 7, the following nonionic surfactants (any of which are manufactured by Kao Corp.) were appropriately used.

Emulgen 320P (trade name); polyoxyethylene stearyl ether, HLB: 14.2

Emulgen 120 (trade name); polyoxyethylene lauryl ether, HLB: 15.3

Emulgen 420 (trade name); polyoxyethylene oleyl ether, HLB: 13.6

Rheodol TW-L120 (trade name); polyoxyethylenesorbitan monolaurate, HLB: 16.7

Rheodol TW-O120 (trade name); polyoxyethylenesorbitan monooleate, HLB: 15.0

Measurement of Characteristics of Latex and Evaluation Method of Bonding Strength 1) Total Solid Content (TSC)

About 1 g of a latex was accurately weighed in a weighing bottle, dried at 100° C. for about one hour and cooled, and then the dry weight was measured. TSC was calculated by the following equation.

$TSC$ (% by weight)=(weight after drying/weight of latex)×100

2) Viscosity

With respect to the latex after one day has passed since the preparation, the viscosity was measured under the conditions of a #2 or #3 spindle, a rotating speed of 60 rpm and a temperature of 23° C. using a BM type viscometer. The cationic graft-modified natural rubber latex of the present invention preferably has the viscosity under these measurement conditions within a range from 10 to 200 mPs.

3) Evaluation of Bonding Strength

According to the T type peel test described in JIS K 6854, a bonding strength was measured. A high-grade cotton canvas cloth was used as the adherend. A test sample was made by coating the cotton canvas cloth with a latex, followed by drying and further lamination of coated surfaces. The bonding strength was represented by a five-rank relative value (1, 2, 3, 4 and 5) after generally evaluating a peel value and a peel state. The higher the value, the better. When the value is 3.5 or more, the bonding strength is preferable for an adhesive.

Examples 1 to 8

According to the formulations shown in Table 1 (Examples 1 to 4) and Table 2 (Examples 5 to 8) below, a methyl methacrylate graft natural rubber latex, a proteolytic enzyme, deionized water, a nonionic surfactant and a cationic surfactant were respectively charged in a predetermined amount in a 1 litter beaker in this order, and then sufficiently mixed for about 60 minutes.

TABLE 1

|  | Example 1 | | Example 2 | | Example 3 | | Example 4 | |
| --- | --- | --- | --- | --- | --- | --- | --- | --- |
|  | Parts by weight (dry) | Parts by weight (wet) | Parts by weight (dry) | Parts by weight (wet) | Parts by weight (dry) | Parts by weight (wet) | Parts by weight (dry) | Parts by weight (wet) |
| Graft-modified natural rubber latex (52%) | 100 | 192 | 100 | 192 | 100 | 192 | 100 | 192 |
| Deproteolytic enzyme (10%) | 0.07 | 0.7 | — | — | — | — | — | — |
| Deionized water | — | 18 | — | 18 | — | 28 | — | 3 |
| Emulgen 920 (10%) | 1.0 | 10 | 1.0 | 10 | 1.0 | 10 | 1.5 | 15 |
| Quartamin 86W (10%) | 3.0 | 30 | 3.0 | 30 | 2.0 | 20 | 4.0 | 40 |
| Total | 104.07 | 250.7 | 104 | 250 | 103 | 250 | 105.5 | 250 |
| Total solid content (% by weight) | 42 | | 42 | | 41 | | 42 | |

TABLE 2

|  | Example 5 | | Example 6 | | Example 7 | | Example 8 | |
| --- | --- | --- | --- | --- | --- | --- | --- | --- |
|  | Parts by weight (dry) | Parts by weight (wet) | Parts by weight (dry) | Parts by weight (wet) | Parts by weight (dry) | Parts by weight (wet) | Parts by weight (dry) | Parts by weight (wet) |
| Graft-modified natural rubber latex (52%) | 100 | 192 | 100 | 192 | 100 | 192 | 100 | 192 |
| Deionized water | — | 18 | — | 18 | — | 18 | — | 18 |
| Emulgen 930 (10%) | 1.0 | 10 | — | — | — | — | — | — |
| Emulgen 840 (10%) | — | — | 1.0 | 10 | — | — | — | — |
| Emulgen 913 (10%) | — | — | — | — | 1.0 | 10 | — | — |
| Emulgen 911 (10%) | — | — | — | — | — | — | 1.0 | 10 |
| Quartamin 86W (10%) | 3.0 | 30 | 3.0 | 30 | 3.0 | 30 | 3.0 | 30 |
| Total | 104 | 250 | 104 | 250 | 104 | 250 | 104 | 250 |
| Total solid content (% by weight) | 42 | | 42 | | 42 | | 42 | |

With respect to the cationic graft-modified natural rubber latexes obtained in the respective Examples described above, the characteristics of the latex were determined by the methods described above and the bonding strength was evaluated.

The results are shown in Table 3.

TABLE 3

|  | Example 1 | Example 2 | Example 3 | Example 4 | Example 5 | Example 6 | Example 7 | Example 8 |
|---|---|---|---|---|---|---|---|---|
| Latex characteristics | | | | | | | | |
| Total solid content (%) | 41.5 | 41.5 | 41.0 | 42.0 | 41.5 | 41.5 | 41.5 | 41.5 |
| Viscosity (mPs) | 25 | 40 | 50 | 37 | 35 | 30 | 60 | 180 |
| Appearance during storage | No change | No change | No change | No change | No change | No change | No change | No change |
| Five-rank evaluation of bonding strength | 5 | 4.5 | 4 | 5 | 4.5 | 4.5 | 4.5 | 4.5 |

(Note)
Viscosity: It is measured after one day has passed since the preparation.
Appearance: It is observed after one week has passed since the preparation.

As is apparent from Table 3, any of the cationic graft-modified natural rubber latexes obtained in Examples 1 to 8 exhibited low viscosity and stability and also exhibited high adhesion to fibers.

Table 4 (Comparative Examples 1 to 4) and Table 5 (Comparative Examples 5 to 7), cationic graft-modified natural rubber latexes (samples for comparison) were prepared.

TABLE 4

|  | Comp. Example 1 | | Comp. Example 2 | | Comp. Example 3 | | Comp. Example 4 | |
|---|---|---|---|---|---|---|---|---|
|  | Parts by weight (dry) | Parts by weight (wet) | Parts by weight (dry) | Parts by weight (wet) | Parts by weight (dry) | Parts by weight (wet) | Parts by weight (dry) | Parts by weight (wet) |
| Graft-modified natural rubber latex (52%) | 100 | 192 | 100 | 192 | 100 | 192 | 100 | 192 |
| Deionized water | — | 58 | — | 28 | — | 18 | — | 18 |
| Emulgen 320 (10%) | — | — | — | — | 1.0 | 10 | — | — |
| Emulgen 120 (10%) | — | — | — | — | — | — | 1.0 | 10 |
| Quartamin 86W (10%) | — | — | 3.0 | 30 | 3.0 | 30 | 3.0 | 30 |
| Total | 100 | 250 | 103 | 250 | 104 | 250 | 104 | 250 |
| Total solid content (% by weight) | 40 | | 41 | | 42 | | 42 | |

TABLE 5

|  | Comp. Example 5 | | Comp. Example 6 | | Comp. Example 7 | |
|---|---|---|---|---|---|---|
|  | Parts by weight (dry) | Parts by weight (wet) | Parts by weight (dry) | Parts by weight (wet) | Parts by weight (dry) | Parts by weight (wet) |
| Graft-modified natural rubber latex (52%) | 100 | 192 | 100 | 192 | 100 | 192 |
| Deionized water | — | 18 | — | 18 | — | 18 |
| Emulgen 420 (10%) | 1.0 | 10 | — | — | — | — |
| Rheodol TW-L120 (10%) | — | — | 1.0 | 10 | — | — |
| Rheodol TW-0120 (10%) | — | — | — | — | 1.0 | 10 |
| Quartamin 86W (10%) | 3.0 | 30 | 3.0 | 30 | 3.0 | 30 |
| Total | 104 | 250 | 104 | 250 | 104 | 250 |
| Total solid content (% by weight) | 42 | | 42 | | 42 | |

Comparative Examples 1 to 7

In the same manner as in the Examples described above, except for using the components and formulations shown in With respect to the respective samples for comparison of Tables 4 and 5, the characteristics of the latex were measured according to the methods described above and the bonding strength was evaluated. The results are shown in Table 6.

TABLE 6

|  | Comp. Example 1 | Comp. Example 2 | Comp. Example 3 | Comp. Example 4 | Comp. Example 5 | Comp. Example 6 | Comp. Example 7 |
|---|---|---|---|---|---|---|---|
| Latex characteristics | | | | | | | |
| Total solid content (%) | 40.0 | 41.0 | 41.5 | 41.5 | 41.5 | 41.5 | 41.5 |
| Viscosity (mPs) | 15 | 1000 | 400 | 500 | 400 | 350 | 350 |
| Appearance during storage | No change | No flow on standing | No flow on standing | No flow on standing | No flow on standing | No flow on standing | No flow on standing |
| Five-rank evaluation of bonding strength | 1 | 3.5 | 3 | 3 | 3 | 3 | 3 |

(Note)
Viscosity: It is measured after one day has passed since the preparation.
Appearance: It is observed after one week has passed since the preparation.

As is apparent from Table 6, the sample of Comparative Example 1 exhibited good stability but was inferior in adhesion to fibers. The samples of Comparative Examples 2 to 7 exhibited high viscosity and unstability, and an improvement in adhesion to fibers was not recognized because of poor dispersion of the cationic surfactant as a result of thickening.

The disclosure of Japanese Patent Application No.11-257563, filed on Sep. 10, 1999, is incorporated herein by reference.

What is claimed is:

1. A cationic graft-modified natural rubber latex composition which comprises a graft-modified natural rubber latex component, a cationic surfactant, and one or more nonionic surfactants selected from the group consisting of polyoxyalkylene alkyl phenyl ether, polyoxyalkylene monostyryl phenyl ether, polyoxyalkylene distyryl phenyl ether and polyoxyalkylene tristyryl phenyl ether, wherein
   (a) the cationic surfactant consists of a quaternary ammonium salt;
   (b) HLB of the nonionic surfactant is within the range from 14 to 19;
   (c) the graft-modified natural rubber latex composition, contains 0.5 to 20% by weight of cationic surfactant and 0.2 to 5.0% by weight of nonionic surfactant based on the weight of the graft-modified natural rubber latex component.

2. The cationic graft-modified natural rubber latex composition according to claim 1, wherein the protein in the natural rubber latex is subject to proteolytic decomposition.

3. The cationic graft-modified natural rubber latex according to claim 1, which contains 1 to 10% by weight of the cationic surfactant and 0.2 to 5.0% by weight of the nonionic surfactant based on the graft-modified natural rubber component.

4. A cationic graft-modified natural rubber latex composition which contains about 25% by weight methyl methacrylate based on the weight of the natural rubber, a cationic surfactant, and one or more nonionic surfactants selected from the group consisting of polyoxyalkylene alkyl phenyl ether, polyoxyalkylene monostyryl phenyl ether, polyoxyalkylene distyryl phenyl ether and polyoxyalkylene tristyryl phenyl ether,
   wherein the cationic surfactant consists of a quaternary ammonium salt,
   wherein HLB of the nonionic surfactant is within a range from 14 to 19, and said
   cationic graft-modified natural rubber latex composition contains 0.5 to 20% by weight of the cationic surfactant and 0.2 to 5% by weight of the nonionic surfactant based on the graft-modified natural rubber component.

5. The cationic graft-modified natural rubber latex composition according to claim 4, wherein a protein in the natural rubber latex is subjected to proteolytic decomposition.

6. The cationic graft-modified natural rubber latex composition according to claim 4, wherein said composition contains 1 to 10% by weight of the cationic surfactant based on the graft-modified natural rubber.

* * * * *